US012767363B2

(12) United States Patent
Sakaguchi et al.

(10) Patent No.: US 12,767,363 B2
(45) Date of Patent: Oct. 20, 2026

(54) WORK ASSISTING SYSTEM

(71) Applicant: Kubota Corporation, Osaka (JP)

(72) Inventors: Kazuo Sakaguchi, Amagasaki (JP); Kohei Seino, Amagasaki (JP); Naohiro Ishikawa, Amagasaki (JP); Yusuke Takahashi, Amagasaki (JP); Kanako Kondo, Amagasaki (JP); Tadahisa Masumoto, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/882,872

(22) Filed: Sep. 12, 2024

(65) Prior Publication Data

US 2025/0002186 A1 Jan. 2, 2025

Related U.S. Application Data

(63) Continuation of application No. PCT/JP2022/015355, filed on Mar. 29, 2022.

(51) Int. Cl.
*B64U 80/86* (2023.01)
*B64U 101/25* (2023.01)
(Continued)

(52) U.S. Cl.
CPC .......... *B64U 80/86* (2023.01); *B64U 2101/25* (2023.01); *B64U 2101/40* (2023.01);
(Continued)

(58) Field of Classification Search
CPC ............ B64U 2101/64; B64U 2101/60; B64U 70/93; B64D 39/06; G05D 1/611; G05D 1/663; G05D 1/667; G05D 2105/15
See application file for complete search history.

(56) References Cited

U.S. PATENT DOCUMENTS 9,056,676 B1 * 6/2015 Wang ........................ B64F 1/22
11,856,882 B2 * 1/2024 Das ...................... A01B 69/008
(Continued)

FOREIGN PATENT DOCUMENTS

EP 3448754 B1 6/2020
JP 2000270618 A 10/2000
(Continued)

OTHER PUBLICATIONS

International Search Report in PCT/JP2022/015355, mailed May 24, 2022, 2 pages.
(Continued)

*Primary Examiner* — Peter D Nolan
(74) *Attorney, Agent, or Firm* — Keating & Bennett, LLP

(57) ABSTRACT

A work assisting system to assist with work performed by a work vehicle includes a flying body including a flying apparatus capable of flying and transporting a work-related article related to the work performed by the work vehicle, and a transfer section connected to the flying apparatus to transfer the work-related article between the flying body and the work vehicle. The flying body includes an information acquirer configured or programmed to acquire work information as information on the work-related article, and the flying body causes the transfer section to transfer the work-related article based on the work information.

14 Claims, 4 Drawing Sheets

(51) Int. Cl.

| | |
|---|---|
| ***B64U 101/40*** | (2023.01) |
| ***B64U 101/60*** | (2023.01) |
| ***G05D 1/611*** | (2024.01) |
| ***G05D 1/661*** | (2024.01) |
| ***G05D 105/15*** | (2024.01) |

(52) U.S. Cl.

CPC .......... *B64U 2101/60* (2023.01); *G05D 1/611* (2024.01); *G05D 1/663* (2024.01); *G05D 2105/15* (2024.01)

(56) References Cited

U.S. PATENT DOCUMENTS

| | | | | |
|---|---|---|---|---|
| 11,873,100 | B2 * | 1/2024 | Wake | B64D 45/04 |
| 12,104,359 | B2 * | 10/2024 | Carpenter | E02F 9/2825 |
| 2007/0079599 | A1 | 4/2007 | Osaku et al. | |
| 2009/0045290 | A1 * | 2/2009 | Small | B64D 39/00 244/135 A |
| 2018/0371723 | A1 | 12/2018 | Nishi et al. | |
| 2019/0071177 | A1 * | 3/2019 | Zvara | A01C 14/00 |
| 2020/0031471 | A1 * | 1/2020 | Datta Gupta | B60K 15/04 |
| 2021/0188458 | A1 * | 6/2021 | Whitworth | B64D 39/06 |
| 2022/0151135 | A1 * | 5/2022 | Das | A01B 69/008 |

FOREIGN PATENT DOCUMENTS

| | | | |
|---|---|---|---|
| JP | 2005083223 | A | 3/2005 |
| JP | 2021006006 | A | 1/2021 |
| JP | 2023066931 | A | 5/2023 |
| WO | 2017131194 | A1 | 8/2017 |

OTHER PUBLICATIONS

Written Opinion in PCT/JP2022/015355, mailed May 24, 2022, 4 pages.

Official Communication issued in corresponding European Patent Application No. 22935116.8, mailed on Dec. 12, 2025, 10 pages.

Official Communication issued in corresponding Japanese Patent Application No. 2024-510773, mailed on Dec. 16, 2025, 3 pages.

* cited by examiner

WORK ASSISTING SYSTEM

CROSS REFERENCE TO RELATED APPLICATIONS

This application is a Continuation Applications of PCT Application No. PCT/JP2022/015355 filed on Mar. 29, 2022. The entire contents of this priority application are hereby incorporated herein by reference.

BACKGROUND OF THE INVENTION

1. Field of the Invention

The present invention relates to work assisting systems to assist with work performed by work vehicles.

2. Description of the Related Art

A work vehicle described in Japanese Unexamined Patent Application Publication No. 2021-6006 has been already known as a work vehicle, for example. The work vehicle (a "riding management machine" in Japanese Unexamined Patent Application Publication No. 2021-6006) can perform a chemical spraying operation by a work device (a "chemical spraying device" in Japanese Unexamined Patent Application Publication No. 2021-6006).

SUMMARY OF THE INVENTION

In a case where the work vehicle for spraying a material (for example, a chemical agent) like the work vehicle described in Japanese Unexamined Patent Application Publication No. 2021-6006 works in a relatively wide area, the work vehicle tends to require supply of the material in the middle of the work. The supply of the material is performed in a material supply station after the work vehicle is moved to the material supply station, for example. This causes a delay in the work. As a result, working efficiency tends to decrease.

Further, in a case where a work vehicle for harvesting crops or the like, for example, works in a relatively wide area, the work vehicle tends to require discharge of the crops in the middle of the work. The discharge of the crops is performed in a crop discharge area after the work vehicle is moved to the crop discharge area, for example. This causes a delay in the work. As a result, working efficiency tends to decrease.

In a case where the work vehicle works in a relatively wide area, the work vehicle may require replacement of a component in the middle of the work. The replacement of the component is performed in a maintenance operations area after the work vehicle is moved to the maintenance operation area, for example. This causes a delay in the work. As a result, working efficiency tends to decrease.

In a case where the work vehicle works in a relatively large area as such, a delay may be caused in the work due to transfer of a work-related article related to the work performed by the work vehicle. As a result, working efficiency tends to decrease.

Note that, in the present specification, material, crops, and component are all non-limiting concrete examples of "the work-related article." In addition, chemical agent, fertilizer, seedling, seedling mat, seed, and fuel are all non-limiting concrete examples of the "material."

In the present specification, supply, discharge, collection, attachment, and detachment are all concrete non-limiting examples of the "transfer."

Example embodiments of the present invention provide work assisting systems that each easily reduce or prevent a decrease in working efficiency due to the transfer of a work-related article.

According to an example embodiment of the present invention, a work assisting system to assist with work performed by a work vehicle includes a flying body including a flying apparatus capable of flying and transporting a work-related article related to the work performed by the work vehicle, and a transfer section connected to the flying apparatus to transfer the work-related article between the flying body and the work vehicle. The flying body includes an information acquirer configured or programmed to acquire work information as information on the work-related article, and the flying body is operative to cause the transfer section to transfer the work-related article based on the work information.

With this configuration, the flying body can approach the work vehicle while transporting the work-related article and transfer the work-related article. Thus, the flying body easily transfers the work-related article while the work vehicle continues its work or while the work vehicle temporarily stops on a farm for the purpose of the transfer. As a result, it is possible to reduce or prevent a decrease in working efficiency due to the transfer of the work-related article.

In this configuration, the flying body transfers the work-related article based on the work information. Thus, in a case where the work information is information indicative of the residual amount of a material, for example, the flying body can supply the work vehicle with an appropriate amount of the material. As a result, the number of times of supply of the material or the supply amount of the material can be easily reduced or minimized. Thus, it is possible to reduce or prevent a decrease in working efficiency due to the transfer of the work-related article.

That is, with this configuration, it is possible to achieve a work assisting system that can easily reduce or prevent a decrease in working efficiency due to the transfer of a work-related article.

In an example embodiment of the present invention, it is preferable that the work assisting system further include a flight controller configured or programmed to control flight of the flying body, the flight controller be configured or programmed to perform a maintaining control to control the flight of the flying body in such a manner as to maintain a positional relationship between the work vehicle and the flying body, during the work performed by the work vehicle, and the transfer section be configured to transfer the work-related article during execution of the maintaining control.

With this configuration, the flying body can transfer the work-related article while the positional relationship between the work vehicle and the flying body is maintained. Thus, the work-related article is easily stably transferred while the work vehicle is traveling and performing the work.

In an example embodiment of the present invention, it is preferable that the work assisting system further include a flight controller configured or programmed to control flight of the flying body, the flight controller be configured or programmed to control the flight of the flying body in such a manner as to cause the flying body to land on the work vehicle, during the work performed by the work vehicle, and the transfer section be configured to transfer the work-related article after the flying body lands on the work vehicle.

With this configuration, the work-related article can be transferred with the flying body being on the work vehicle. Thus, the work-related article is easily stably transferred while the work vehicle is traveling and performing the work.

In an example embodiment of the present invention, it is preferable that at least either of the work vehicle and the transfer section be configured to switchable between a first state, in which the transfer of the work-related article is not performable, and a second state, in which the transfer of the work-related article is performable, and the work assisting system further include a state controller configured or programmed to switch the at least either the work vehicle or the transfer section between the first state and the second state.

In this configuration, in the first state, the work-related article is easily stably retained or stored in the work vehicle or the transfer section. In addition, when the work vehicle or the transfer section is switched from the first state to the second state, the work-related article can be transferred.

Accordingly, with this configuration, it is possible to achieve a work assisting system which can transfer a work-related article between a flying body and a work vehicle and which can easily stably retain or store the work-related article in the work vehicle or a transfer section.

In an example embodiment of the present invention, it is preferable that the state controller be configured or programmed to switch the at least either the work vehicle or the transfer section from the first state to the second state while the flying body is flying toward the work vehicle to transfer the work-related article.

In this configuration, in comparison with a case where the work vehicle or the transfer section is switched from the first state to the second state after the flying body has reached the work vehicle, it is possible to reduce or prevent a waiting time after the flying body has reached the work vehicle but before the work-related article is transferred. This makes it possible to easily smoothly cause the flying body to fly toward the work vehicle and to finish transferring the work-related article.

In an example embodiment of the present invention, it is preferable that the work assisting system include a connection mechanism configured to connect the work vehicle to the transfer section, the connection mechanism being switchable between a locked state, in which the work vehicle is kept connected to the transfer section, and an unlocked state, in which the work vehicle is disconnectable from the transfer section, and a lock controller configured or programmed to switch the connection mechanism between the locked state and the unlocked state.

In this configuration, the connection mechanism is switched to the locked state during execution of the transfer of the work-related article, thereby making it possible to avoid such a situation that the work vehicle is disconnected from the transfer section in the middle of the transfer of the work-related article.

In an example embodiment of the present invention, it is preferable that the work assisting system include an execution determiner configured or programmed to determine an execution position or an execution timing for the transfer of the work-related article between the flying body and the work vehicle based on the work information.

With this configuration, in comparison with a configuration in which the work-related article is transferred regardless of the work information, it is possible to easily attain an appropriate execution position or an appropriate execution timing for the transfer of the work-related article.

In an example embodiment of the present invention, it is preferable that the execution determiner be configured or programmed to determine the execution position or the execution timing in such a manner as to cause the work performed by the work vehicle to be less delayed due to the transfer of the work-related article.

With this configuration, it is possible to reduce or prevent delay in the work performed by the work vehicle due to the transfer of the work-related article. As a result, it is possible to reduce or prevent a decrease in working efficiency due to the transfer of the work-related article.

In an example embodiment of the present invention, it is preferable that, in a case where a material as the work-related article is transferred from the flying body to the work vehicle, the execution determiner be configured or programmed to determine the execution position or the execution timing in such a manner as to prevent the work vehicle from running out of the material.

With this configuration, the material in the work vehicle is hard to run out. As a result, the work vehicle can easily continue its work.

In an example embodiment of the present invention, it is preferable that the execution determiner be configured or programmed to determine the execution position or the execution timing in such a manner as to secure stability of the transfer of the work-related article.

With this configuration, the stability of the transfer of the work-related article is easily secured. As a result, it is possible to avoid such a situation that it is necessary to try to transfer the work-related article again due to failure in the transfer of the work-related article.

In an example embodiment of the present invention, it is preferable that the execution determiner be configured or programmed to determine the execution position or the execution timing in such a manner as to cause the work-related article to be transferred while the work vehicle linearly moves.

With this configuration, the flying body easily flies to maintain the positional relationship between the work vehicle and the flying body during execution of the transfer of the work-related article. Thus, the work-related article is easily stably transferred while the work vehicle is traveling and performing the work.

In an example embodiment of the present invention, it is preferable that the execution determiner be configured or programmed to determine the execution position or the execution timing in such a manner as to cause the work-related article to be transferred while the work vehicle travels at a low speed.

With this configuration, the flying body easily flies to maintain the positional relationship between the work vehicle and the flying body during execution of the transfer of the work-related article. Thus, the work-related article is easily stably transferred while the work vehicle is traveling and performing the work.

In an example embodiment of the present invention, it is preferable that the execution determiner be configured or programmed to determine the execution timing to be a timing at which a distance between the work vehicle and a farm location where the flying body waits becomes a predetermined distance or less.

When the work vehicle performing its work in the farm approaches the farm end, the vehicle speed of the work vehicle tends to decrease due to turn or the like. On this account, with this configuration, it is possible to easily transfer the work-related article while the vehicle speed of the work vehicle decreases. As a result, the work-related article is easily stably transferred while the work vehicle is traveling and performing the work. Besides, with this configuration, the flight distance of the flying body is easily made relatively short. This consequently allows the flying body to easily reduce or minimize its energy consumption (for example, power consumption of a battery).

In an example embodiment of the present invention, it is preferable that in a case where preparation in the flying body for the transfer of the work-related article is finished, the execution determiner be configured or programmed to calculate the predetermine distance based on a time required for the flying body to reach the work vehicle after the flying body starts flying, and in a case where the preparation is not finished, the execution determiner be configured or programmed to calculate the predetermined distance based on a total time of a time required for the preparation and a time required for the flying body to reach the work vehicle after the flying body starts flying.

In a case where the preparation in the flying body for the transfer of the work-related article is finished, the flying body can fly away toward the work vehicle immediately as necessary. In the meantime, in a case where the preparation in the flying body for the transfer of the work-related article is not finished, it is necessary for the flying body to make the preparation before the flying body flies away. Accordingly, the time required for the flying body to reach the work vehicle after work for the transfer of the work-related article is started varies depending on whether or not the preparation in the flying body for the transfer of the work-related article is finished.

Here, with this configuration, it is possible to achieve a configuration in which an appropriate predetermined distance is calculated depending on whether or not the preparation in the flying body for the transfer of the work-related article is finished. Thus, it is possible to appropriately and efficiently transfer the work-related article.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
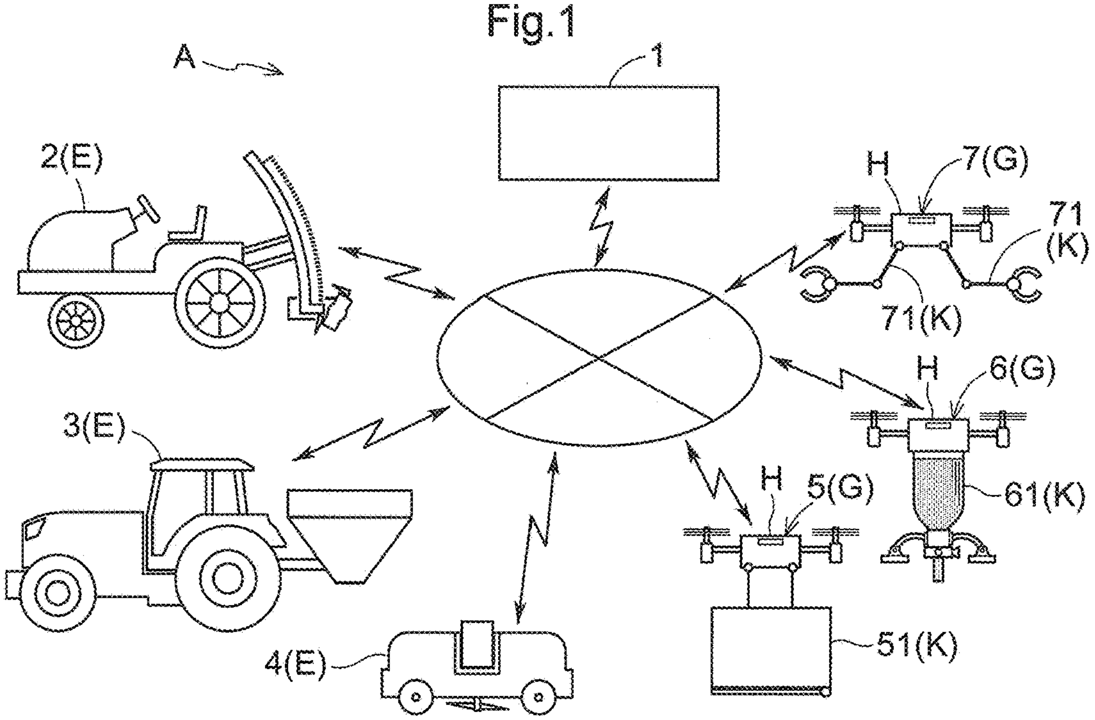
FIG. 1 is a general drawing of a work assisting system.

As illustrated in FIG. 1, a work assisting system A in the present example embodiment includes a management computer 1, a plurality of work vehicles E, and a plurality of flying bodies G.

However, example embodiments of the present invention are not limited to this, and the work assisting system A may not include the plurality of work vehicles E.

Each work vehicle E in the present example embodiment performs work on a farm. However, example embodiments of the present invention are not limited to this. The work vehicle E may be a vehicle performing work in a place other than a farm.

The work assisting system A is configured or programmed to assist with work performed by each work vehicle E with use of the plurality of flying bodies G. That is, the work assisting system A is a system to assist with work performed by the work vehicle E. The work assisting system A also includes the plurality of flying bodies G.

In the present example embodiment, the plurality of work vehicles E includes a rice transplanter 2, a tractor 3, and a mower 4, for example. The plurality of flying body G includes a first flying body 5, a second flying body 6, and a third flying body 7. Each flying body G is a multicopter. However, example embodiments of the present invention are not limited to this, and the flying body G may not be a multicopter, provided that the flying body G can fly.

Figure 2:
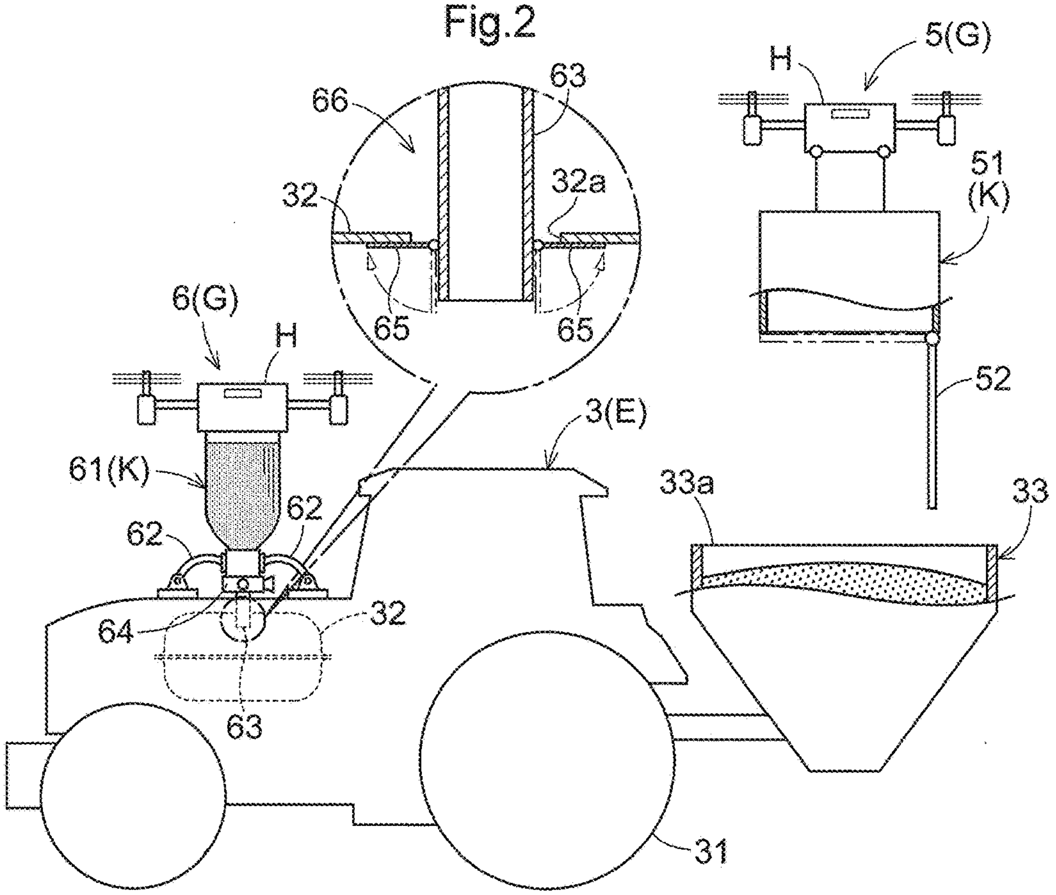
FIG. 2 is a view illustrating supply of a chemical agent and fuel.

As illustrated in FIGS. 1, 2, the flying bodies G include respective flying apparatus H preferably having the same configuration, for example. The flying bodies G also include respective transfer sections K of different types.

The flying apparatus H includes a plurality of propellers or the like, for example, so that the flying apparatus H can fly. The flying apparatus H can transport a work-related article. The work-related article is an article related to work performed by the work vehicle E.

The transfer section K is configured to transfer the work-related article between the flying body G and the work vehicle E. The transfer section K is connected to a lower portion of the flying apparatus H.

That is, the work assisting system A includes the flying body G including the flying apparatus H capable of flying and transporting the work-related article related to the work performed by the work vehicle E, and the transfer section K connected to the flying apparatus H.

As illustrated in FIG. 2, the tractor 3 as the work vehicle E includes a travel device 31 and a fuel tank 32 (corresponding to a "reservoir" according to an example embodiment of the present invention). More specifically, the travel device 31 includes a wheel. Fuel (corresponding to the "work-related article" according to an example embodiment of the present invention) is retained in the fuel tank 32.

That is, the tractor 3 includes the fuel tank 32 configured to retain fuel.

The tractor 3 also includes a hopper 33 (corresponding to the "reservoir" according to an example embodiment of the present invention). A chemical agent (corresponding to the "work-related article" according to an example embodiment of the present invention) is retained in the hopper 33.

That is, the tractor 3 includes the hopper 33 configured to retain a chemical agent.

The tractor 3 includes an engine (not illustrated) driven by fuel. The travel device 31 is driven by power output from this engine, and the chemical agent is sprayed downward from the hopper 33. Thus, the tractor 3 travels by the travel device 31 and sprays the chemical agent from the hopper 33 in a farm, for example.

The hopper 33 includes an opening 33*a* facing upward.

As illustrated in FIG. 2, the first flying body 5 includes a material supply section 51 as the transfer section K. The material supply section 51 is connected to the flying apparatus H via wires. The material supply section 51 has a box shape and can store the chemical agent.

When the flying apparatus H flies with the chemical agent being stored in the material supply section 51, the flying apparatus H can transport the chemical agent.

The material supply section 51 includes a lower end portion provided with an opening-closing section 52. The opening-closing section 52 is openable and closable by an electric motor or the like, for example. As illustrated in FIG. 2, when the opening-closing section 52 is opened with the material supply section 51 being placed above the opening 33*a*, the chemical agent stored in the material supply section 51 is moved down to the opening 33*a*. Thus, the hopper 33 is supplied with the chemical agent.

That is, the transfer section K of the first flying body 5 is configured to supply the hopper 33 with the chemical agent from the first flying body 5 by moving the chemical agent down to the opening 33*a* from above the opening 33*a*.

Figure 3:
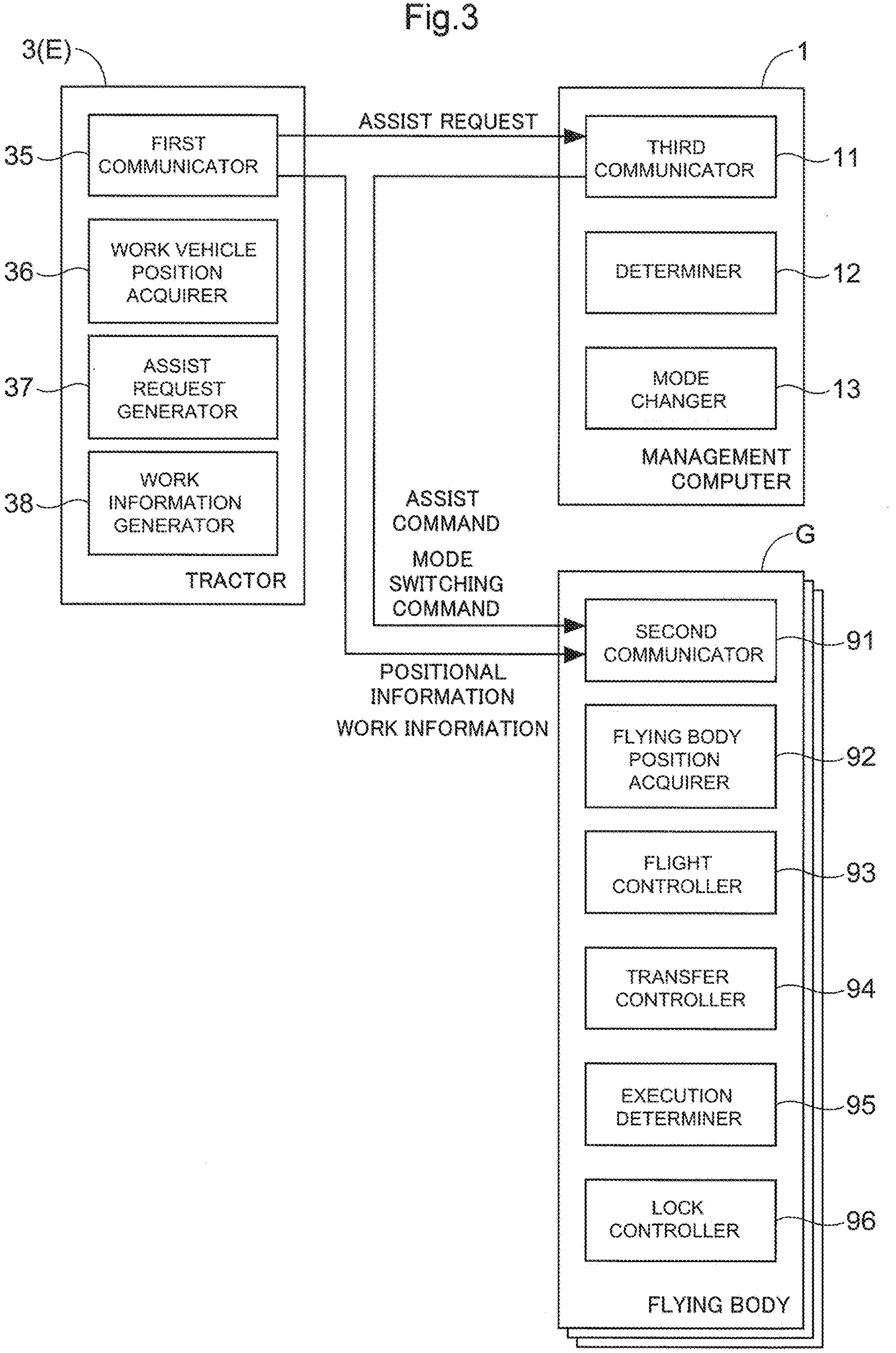
FIG. 3 is a block diagram illustrating the configuration of the work assisting system.

As illustrated in FIG. 3, the tractor 3 includes a first communicator 35. Note that each work vehicle E other than the tractor 3 also includes the first communicator 35. Each flying body G includes a second communicator 91. The management computer 1 is configured or programmed to include a third communicator 11 (corresponding to an "acquirer" according to an example embodiment of the present invention).

The first communicator 35, the second communicator 91, and the third communicator 11 are configured or programmed to be communicable to each other by the Internet, short-distance wireless communications, or the like, for example. Accordingly, as illustrated in FIG. 1, each work vehicle E, each flying body G, and the management computer 1 are communicably connected to each other.

As illustrated in FIG. 3, the tractor 3 includes a work vehicle position acquirer 36 and an assist request generator 37. The work vehicle position acquirer 36 includes a satellite positioning device configured to receive a GPS signal from an artificial satellite used for a GPS (global positioning system). The work vehicle position acquirer 36 calculates position coordinates of the tractor 3 based on the received GPS signal over time. Thus, the work vehicle position acquirer 36 acquires positional information on the tractor 3.

Note that example embodiments of the present invention are not limited to this. The work vehicle position acquirer 36 may not use the GPS. For example, the work vehicle position acquirer 36 may use a GNSS (GLONASS, Galileo, Michibiki, BeiDou, or the like) other than the GPS.

The assist request generator 37 generates an assist request based on a state of the tractor 3 which state is related to the work-related article. The assist request is a signal indicative of an assist detail requested for the work performed by the work vehicle E. For example, the assist request generator 37 generates an assist request to request supply of the chemical agent based on the residual amount of the chemical agent retained in the hopper 33. More specifically, when the chemical agent retained in the hopper 33 decreases, the assist request generator 37 may generate an assist request to request supply of the chemical agent.

The tractor 3 also includes a work information generator 38. The work information generator 38 generates work information. The work information is information on the work-related article. The work information may be information indicative of the residual amount of the chemical agent retained in the hopper 33, may be information indicative of the residual amount of fuel retained in the fuel tank 32, or may be information indicative of a necessary amount of the chemical agent or the fuel required until completion of the work, for example. The information indicative of the residual amount of the chemical agent retained in the hopper 33 may be a distance by which the tractor 3 travels, for example. In a case where the amount of the chemical agent to be sprayed by the tractor 3 per unit travel distance is known, the residual amount of the chemical agent retained in the hopper 33 can be calculated based on the distance by which the tractor 3 travels.

Note that each work vehicle E other than the tractor 3 also includes the work vehicle position acquirer 36, the assist request generator 37, and the work information generator 38.

Each flying body G includes a flying body position acquirer 92, a flight controller 93, and a transfer controller 94.

The flying body position acquirer 92 has a configuration similar to that of the work vehicle position acquirer 36. Thus, the flying body position acquirer 92 acquires positional information on the flying body G.

The flight controller 93 is configured or programmed to control flight of the flying body G by controlling the flying apparatus H based on the positional information acquired by the flying body position acquirer 92. That is, the work assisting system A includes the flight controller 93 configured or programmed to control flight of the flying body G.

The transfer controller 94 is configured or programmed to control the transfer section K. For example, the transfer controller 94 of the first flying body 5 is configured or programmed control opening and closing of the opening-closing section 52.

As illustrated in FIGS. 3, the first communicator 35 of the tractor 3 transmits the assist request generated by the assist request generator 37 to the third communicator 11. Thus, the third communicator 11 acquires an assist detail requested for the work performed by the work vehicle E.

That is, the work assisting system A includes the third communicator 11 configured or programmed to acquire the requested assist detail.

As illustrated in FIG. 3, the management computer 1 is configured or programmed to include a determiner 12. The determiner 12 determines a flying body G suitable for the transfer of the work-related article from among a plurality of flying bodies G based on the assist request acquired by the third communicator 11.

That is, the work assisting system A includes the determiner 12 configured or programmed to determine a flying body G suitable for the transfer of the work-related article from among the plurality of flying bodies G based on an acquisition result acquired by the third communicator 11.

The third communicator 11 transmits an assist command to the second communicator 91 of the flying body G determined by the determiner 12. The second communicator 91 of the flying body G which second communicator 91 has received the assist command acquires positional information on a target work vehicle and work information on the target work vehicle from the first communicator 35 of the target work vehicle as the work vehicle E that has transmitted the assist request to the management computer 1. Note that the positional information is information acquired by the work vehicle position acquirer 36 of the target work vehicle. The work information is information generated by the work information generator 38 of the target work vehicle. The flying body G that has received the assist command transfers the work-related article to or from the target work vehicle based on the positional information on the flying body G, the positional information on the target work vehicle, and the work information on the target work vehicle.

For example, in a case where the tractor 3 transmits an assist request for supply of the chemical agent to the management computer 1, the determiner 12 determines the first flying body 5 as a flying body G to supply the chemical agent. The first flying body 5 that has received the assist command flies toward the tractor 3 through control by the flight controller 93 based on the positional information on the first flying body 5 and the positional information on the tractor 3. The first flying body 5 supplies the hopper 33 with the chemical agent through control by the transfer controller 94 based on the work information on the tractor 3. Note that, in this case, for example, the work information may be information indicative of the residual amount of the chemical agent retained in the hopper 33, and the material supply section 51 of the first flying body 5 may supply the chemical agent to a maximum retention amount in the specification of the hopper 33 based on the residual amount.

Thus, the flying body G includes the second communicator 91 configured or programmed to acquire the work information as information on the work-related article. The flying body G also transfers the work-related article by the transfer section K based on the work information.

Each flying body G is configured to transfer the work-related article while the work vehicle E is traveling and performing its work. In order to achieve the transfer of the work-related article while the work vehicle E is traveling and performing the work, the flight controller 93 illustrated in FIG. 3 is configured or programmed to perform a maintaining control based on the positional information on the work vehicle E and the positional information on the flying body G during the work performed by the work vehicle E. The maintaining control is to control flight of the flying body G in a such a manner as to maintain the positional relationship between the work vehicle E and the flying body G.

That is, the flight controller 93 can perform the maintaining control during the work performed by the work vehicle E such that the flight of the flying body G is controlled in a such a manner as to maintain the positional relationship between the work vehicle E and the flying body G. The transfer section K is configured to transfer the work-related article during the execution of the maintaining control.

For example, the flight controller 93 of the first flying body 5 illustrated in FIG. 2 is configured or programmed to perform the maintaining control based on positional information on the tractor 3 and positional information on the first flying body 5 during the work performed by the tractor 3. The material supply section 51 is configured to move the chemical agent during the execution of the maintaining control. Thus, the first flying body 5 can supply the hopper 33 with the chemical agent while the tractor 3 is traveling and spraying the chemical agent.

As illustrated in FIG. 3, each flying body G includes an execution determiner 95. The execution determiner 95 determines an execution position or an execution timing for the transfer of the work-related article between the flying body G and the work vehicle E based on the work information acquired by the second communicator 91.

That is, the work assisting system A includes the execution determiner 95 configured to determine an execution position or an execution timing for the transfer of the work-related article between the flying body G and the work vehicle E based on the work information.

The execution determiner 95 may determine at which point in the farm the work-related article is to be transferred, for example.

The flight controller 93 controls the flight of the flying body G based on the determination made by the execution determiner 95. The transfer controller 94 controls the transfer section K based on the determination made by the execution determiner 95.

The execution determiner 95 can change a control mode between a plurality of modes. More specifically, the control mode of the execution determiner 95 is changeable between a first mode, a second mode, a third mode, a fourth mode, a fifth mode, and a sixth mode. What is prioritized in determining an execution position or an execution timing for the transfer of the work-related article varies depending on the control mode.

In a case where the execution determiner 95 is in the first mode, the execution determiner 95 determines the execution position or the execution timing so that the work performed by the work vehicle E is less delayed due to the transfer of the work-related article. In this case, for example, the execution position or the execution timing is determined so that the vehicle speed of the work vehicle E does not decelerate due to the transfer of the work-related article.

In a case where the execution determiner 95 is in the second mode, when a material is transferred from the flying body G to the work vehicle E, the execution determiner 95 determines the execution position or the execution timing so that the work vehicle E does not run out of the material. In this case, for example, the execution position or the execution timing is determined so that the material is immediately supplied at the point when the residual amount of the material in the work vehicle E goes below 50% of the maximum amount in the specification, for example.

In a case where the execution determiner 95 is in the third mode, the execution determiner 95 determines the execution position or the execution timing so that the stability of the transfer of the work-related article is secured. In this case, the execution position or the execution timing is determined so that the transfer is performed at the time when the work vehicle E travels in a region where the surface of the farm is less bumpy, for example.

In a case where the execution determiner 95 is in the fourth mode, the execution determiner 95 determines the execution position or the execution timing so that the work-related article is transferred while the work vehicle E linearly moves.

In a case where the execution determiner 95 is in the fifth mode, the execution determiner 95 determines the execution position or the execution timing so that the work-related article is transferred while the work vehicle E travels at a low speed.

In a case where the execution determiner 95 is in the sixth mode, the execution determiner 95 determines the execution timing to be a timing at which a distance between the work vehicle E and a farm end where the flying body G waits becomes a predetermined distance or less. At this time, in a case where preparation in the flying body G for the transfer of the work-related article is finished, the execution determiner 95 calculates the predetermine distance based on a time required for the flying body G to reach the position of the work vehicle E after the flying body G starts flying. In a case where the preparation is not finished, the execution determiner 95 determines the predetermined distance based on a total time of a time required for the preparation and a time required for the flying body G to reach the position of the work vehicle E after the flying body G starts flying. Note that the "execution timing" herein may be a timing when preparation in the flying body G for the transfer of the work-related article is started before the flying body G takes off, may be a timing when the flying body G takes off, or may be a moment when the work-related article is actually moved between the flying body G and the work vehicle E. The "preparation" herein may be a work of loading the flying body G with the work-related article scheduled to be supplied to the work vehicle E, for example.

That is, the execution determiner 95 can determine the execution position or the execution timing so that the work performed by the work vehicle E is less delayed due to the transfer of the work-related article. In a case where the material as the work-related article is transferred from the flying body G to the work vehicle E, the execution determiner 95 can also determine the execution position or the execution timing so that the work vehicle E does not run out of the material. The execution determiner 95 can also determine the execution position or the execution timing so that the stability of the transfer of the work-related article is secured. The execution determiner 95 can also determine the execution position or the execution timing so that the work-related article is transferred while the work vehicle E linearly moves. The execution determiner 95 can also determine the execution position or the execution timing so that the work-related article is transferred while the work vehicle E travels at a low speed. The execution determiner 95 can also determine the execution timing to be a timing at which the distance between the work vehicle E and the farm end where the flying body G waits becomes a predetermined distance or less.

Note that pieces of information to be exchanged between the work vehicle E and the flying body G may be prioritized based on types of information, and the order of priority may be changed in response to the control mode of the execution determiner 95.

As illustrated in FIG. 3, the management computer 1 is configured or programmed to include a mode changer 13. The mode changer 13 generates a mode switching command based on an operation input by a user, or the like, for example. The generated mode switching command is transmitted from the third communicator 11 to the second communicator 91. The flying body G switches the control mode of the execution determiner 95 in response to the received mode switching command.

As illustrated in FIG. 2, the second flying body 6 includes a refueling section 61 as the transfer section K. The refueling section 61 can store fuel such as gasoline. The flying apparatus H can transport the fuel such that the flying apparatus H flies with the fuel being stored in the refueling section 61.

The refueling section 61 includes a tubular structure 63 and an opening-closing valve 64. The tubular structure 63 is configured such that the fuel can pass through the tubular structure 63.

That is, the refueling section 61 includes the tubular structure 63. Note that the tubular structure 63 may have a flexibility or may not have a flexibility. In a case where the tubular structure 63 has a flexibility, the fuel can be transferred with the second flying body 6 being connected to the fuel tank 32 via the tubular structure 63. Even if the positional relationship between the second flying body 6 and the fuel tank 32 changes to some extent during the transfer of the fuel, the tubular structure 63 deforms, so that the second flying body 6 is easily kept connected to the fuel tank 32. Thus, even if the positional relationship between the second flying body 6 and the fuel tank 32 changes to some extent during the transfer of the fuel, the transfer of the fuel is easily surely performed.

The tubular structure 63 is configured to be insertable into a supply hole 32*a* provided on the top surface of the fuel tank 32. The opening-closing valve 64 is openable and closable by an electric motor or the like, for example. When the opening-closing valve 64 is in an open state, the fuel stored in the refueling section 61 is discharged downward through the tubular structure 63. When the opening-closing valve 64 is in a closed state, the fuel stored in the refueling section 61 is not discharged. Note that the opening-closing valve 64 is controlled by the transfer controller 94 illustrated in FIG. 3.

As illustrated in FIG. 2, when the opening-closing valve 64 is brought into the open state with the tubular structure 63 being inserted into the supply hole 32*a*, the fuel stored in the refueling section 61 is supplied to the fuel tank 32 through the tubular structure 63.

That is, the refueling section 61 is configured to supply the fuel between the second flying body 6 and the fuel tank 32 through the tubular structure 63.

The tubular structure 63 and a plurality of opening and closing mechanisms 65 define a connection mechanism 66. As illustrated in FIG. 2, the connection mechanism 66 connects the fuel tank 32 to the refueling section 61.

That is, the work assisting system A includes the connection mechanism 66 configured to connect the tractor 3 to the refueling section 61.

The plurality of opening and closing mechanisms 65 is provided in a lower end portion of the tubular structure 63. Each of the opening and closing mechanisms 65 may have a plate shape or a bar shape. Each of the opening and closing mechanisms 65 is configured to be vertically swingable by an electric motor, as illustrated in FIG. 2, for example.

When each of the opening and closing mechanisms 65 is at a horizontal position, an upward movement of the tubular structure 63 inserted into the supply hole 32*a* is restricted. At this time, the connection mechanism 66 is in a locked state. Note that the locked state is a state where the tractor 3 (the work vehicle E) is kept connected to the refueling section 61 (the transfer section K).

When each of the opening and closing mechanisms 65 is at a vertical position, the upward movement of the tubular structure 63 inserted into the supply hole 32*a* is allowed. At this time, the connection mechanism 66 is in an unlocked state. Note that the unlocked state is a state where the tractor 3 (the work vehicle E) is disconnectable from the refueling section 61 (the transfer section K).

As illustrated in FIG. 3, each flying body G includes a lock controller 96. The lock controller 96 controls vertical swinging of the plurality of opening and closing mechanisms 65. Thus, the lock controller 96 can switch the connection mechanism 66 between the locked state and the unlocked state.

With the configuration described above, the connection mechanism 66 illustrated in FIG. 2 is changeable between the locked state, in which the tractor 3 (the work vehicle E) is kept connected to the refueling section 61 (the transfer section K), and the unlocked state, in which the tractor 3 (the work vehicle E) is disconnectable from the refueling section 61 (the transfer section K). The work assisting system A also includes the lock controller 96 configured or programmed to switch the connection mechanism 66 between the locked state and the unlocked state.

Note that the transfer section K is connected to the flying apparatus H in a detachable manner. The flying apparatus H is configured to replace the transfer section K connected to the flying apparatus H with a transfer section K of another type. For example, after the material supply section 51 is detached from the flying apparatus H of the first flying body 5, the refueling section 61 is connectable to the flying apparatus H.

In order to achieve the transfer of the work-related article while the work vehicle E is traveling and performing the work, the flight controller 93 illustrated in FIG. 3 is configured or programmed to perform a vehicle body landing control based on the positional information on the work vehicle E and the positional information on the flying body G during the work performed by the work vehicle E. The vehicle body landing control is to control the flight of the flying body G in such a manner as to cause the flying body G to land on the work vehicle E.

That is, the flight controller 93 is configured or programmed to control the flight of the flying body G in such a manner as to cause the flying body G to land on the work vehicle E, during the work performed by the work vehicle E. The transfer section K is configured to transfer the work-related article after the flying body G lands on the work vehicle E.

For example, the refueling section 61 of the second flying body 6 illustrated in FIG. 2 has a lower portion provided with leg portions 62. The second flying body 6 can land on the tractor 3 such that the bottom surfaces of the leg portions 62 come into contact with a flat portion of the tractor 3 (for example, the top surface of a bonnet, or the top surface of a roof).

The flight controller 93 of the second flying body 6 is configured or programmed to control the flight of the second flying body 6 based on the positional information on the tractor 3 and the positional information on the second flying body 6 during the work performed by the tractor 3 such that the second flying body 6 lands on the tractor 3. At this time, the flight controller 93 controls the flight of the second flying body 6 such that the tubular structure 63 is inserted into the supply hole 32*a*. The refueling section 61 is configured to discharge the fuel downward after the second flying body 6 lands on the tractor 3. Thus, the second flying body 6 can supply the fuel to the fuel tank 32 while the tractor 3 is traveling and spraying the chemical agent.

Note that the connection mechanism 66 is controlled in the locked state after the second flying body 6 lands on the tractor 3 but before the supply of the fuel to the fuel tank 32 is finished. When the supply of the fuel to the fuel tank 32 is finished, the connection mechanism 66 is switched from the locked state to the unlocked state.

Figure 4:
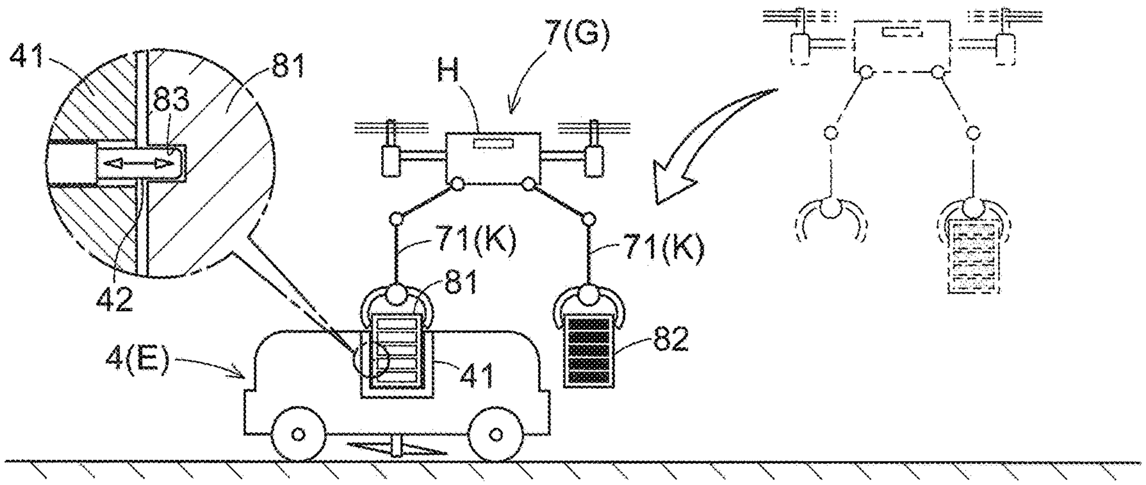
FIG. 4 is a view illustrating replacement of a battery.

As illustrated in FIG. 4, an electric mower 4 as the work vehicle E includes a battery mounting section 41. A battery (corresponding to the "work-related article" according to an example embodiment of the present invention) is mounted on the battery mounting section 41. The mower 4 can perform mowing by electric power supplied from the battery mounted on the battery mounting section 41 while the mower 4 is traveling.

That is, the mower 4 is configured to use the battery with the battery being attached to the mower 4. In FIG. 4, a first battery 81 (corresponding to the "work-related article" according to an example embodiment of the present invention) as the battery is mounted on the battery mounting section 41.

As illustrated in FIG. 4, the transfer section K of the third flying body 7 includes a plurality of grippers 71. More specifically, the transfer section K of the third flying body 7 includes two grippers 71, for example. Each gripper 71 is a robot arm driven by an actuator (not illustrated). The actuator may be, for example, an electric motor or a hydraulic motor.

As illustrated in FIG. 4, the grippers 71 can grip the first battery 81 and a second battery 82 (corresponding to the "work-related article" according to an example embodiment of the present invention). The first battery 81 and the second battery 82 are both batteries. The flying apparatus H can transport a battery such that the flying apparatus H flies with the battery being gripped by the gripper 71. The transfer section K of the third flying body 7 is configured to transfer batteries by two grippers 71.

Figure 5:
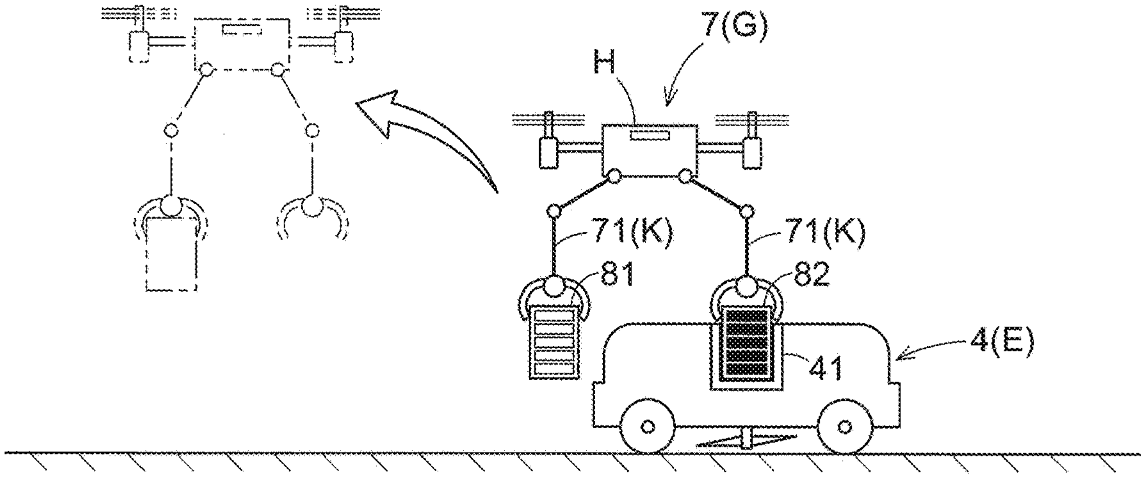
FIG. 5 is a view illustrating replacement of the battery.

For example, as illustrated in FIGS. 4, 5, the third flying body 7 flies toward the mower 4 with the second battery 82 being gripped by one of the grippers 71. Then, the third flying body 7 causes the other one of the grippers 71 to grip and detach the first battery 81 mounted on the battery mounting section 41. The third flying body 7 causes the one of the grippers 71 to attach the second battery 82 to the battery mounting section 41. After that, the third flying body 7 flies away from the mower 4 with the first battery 81 being gripped by the other one of the grippers 71.

That is, the transfer section K of the third flying body 7 is configured to detach the first battery 81 as a battery attached to the mower 4 and attach the second battery 82 as another battery to the mower 4, so that the first battery 81 and the second battery 82 are transferred.

With this configuration, the third flying body 7 can replace the battery of the mower 4. For example, in a case where the first battery 81 has a relatively small charging rate, and the second battery 82 has a relatively large charging rate, when the first battery 81 is replaced with the second battery 82, it is possible to extend a time during which the mower 4 can continue its work.

Note that example embodiments of the present invention are not limited to this. For example, the work vehicle E may include a reservoir in which the fuel is retained, and the transfer section K may be configured to supply the fuel such that the transfer section K detaches the reservoir from the work vehicle E and attaches another reservoir (preferably, a reservoir fully filled with the fuel) to the work vehicle E in a similar manner to the battery replacement described above. In this case, it is possible to extend the time during which the work vehicle E can continue its work.

Alternatively, for example, the work vehicle E configured to harvest crops may include a reservoir in which the crops are retained, and the transfer section K may be configured to collect the crops such that the transfer section K detaches the reservoir from the work vehicle E and attaches another reservoir (preferably, an empty reservoir) to the work vehicle E in a similar manner to the battery replacement described above. In this case, it is possible to extend the time during which the work vehicle E can continue its work.

That is, the transfer section K may be configured to, in a case where the work vehicle E includes a reservoir configured to retain the work-related article, transfer the work-related article such that the transfer section K detaches the reservoir from the work vehicle E and attaches another reservoir to the work vehicle E.

Some of or all the crops retained in the reservoir may be moved to the flying body G through the transfer section K. In such an example embodiment, it is preferable that the flying body G include an empty reservoir. For example, the reservoir of the work vehicle E may include a discharge port, the reservoir of the flying body G may include a supply port, and the discharge port may be connected to the supply port via the transfer section K. In this case, when the flying body G flies so that the position of the supply port is located lower than the position of the discharge port, the flying body G can collect the crops by gravity. In this case, the flying body G may include a load detection sensor configured to detect a load caused by the collected crops. With use of the load detection sensor, the collection of the crops can be controlled such that the load caused by the collected crops becomes equal to or lower than an upper limit load allowable for the flying body G to fly.

Figure 6:
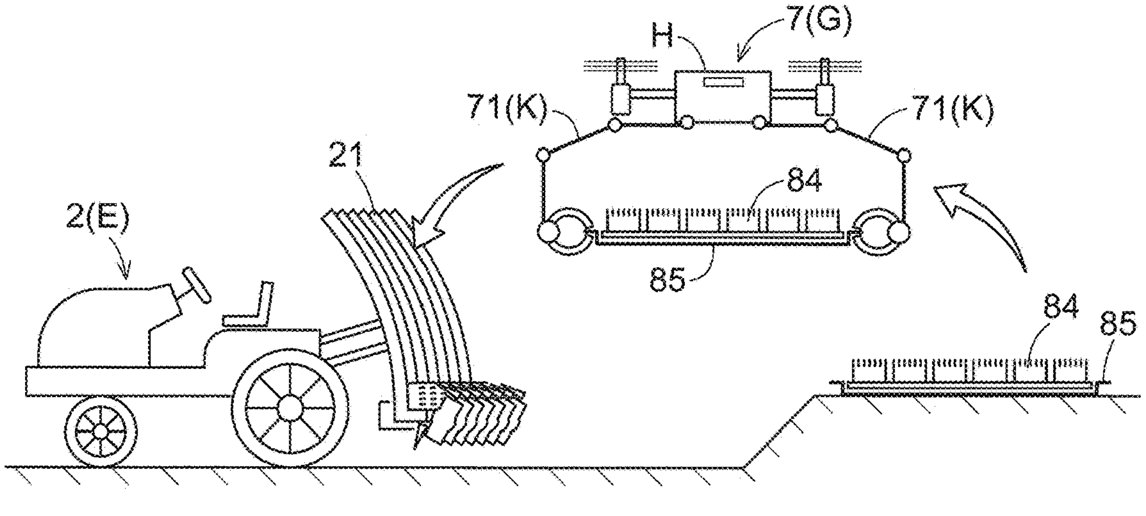
FIG. 6 is a view illustrating supply of a seedling mat.

As illustrated in FIG. 6, a rice transplanter 2 as the work vehicle E includes a seedling base 21. The third flying body 7 can grip a support 85 supporting one or more seedling mats

84 (corresponding to the "work-related article" according to an example embodiment of the present invention) by two grippers 71. The flying apparatus H can transport the one or more seedling mats 84 such that the flying apparatus H flies with the support 85 being gripped by the grippers 71. Note that the support 85 may be a scoop board or may be a seedling box, for example. The transfer section K of the third flying body 7 is configured to supply the seedling mat 84 by the two grippers 71.

In the example illustrated in FIG. 6, the support 85 supporting a plurality of seedling mats 84 is put on a ridge between rice fields. The third flying body 7 causes the two grippers 71 to grip the support 85. Subsequently, the third flying body 7 flies toward the seedling base 21 of the rice transplanter 2 with the support 85 being gripped by the two grippers 71. The third flying body 7 inclines the support 85 to slide the plurality of seedling mats 84, so that the seedling base 21 is supplied with the plurality of seedling mats 84.

Note that, in this case, it is preferable that the number of rows of the seedling mats 84 that can be put on the seedling base 21 be the same as the number of rows of the seedling mats 84 supported by the support 85.

However, example embodiments of the present invention are not limited to this. For example, the grippers 71 may be able to directly grip one or more seedling mats 84.

The transfer section K may be also able to supply the seedling base 21 with one seedling mat 84. Thus, in a case where the rice transplanter 2 can change the number of planting rows, it is possible to locally supply the seedling mat 84 to a portion of the seedling base 21 which portion has a relatively small number of seedling mats 84.

The gripper 71 may be also able to grip an article other than the above-described articles targeted for gripping. For example, the grippers 71 may be able to grip a wall material for construction, a pipe, or the like, or may be able to grip a storage to store a work-related articles such as a fertilizer, for example.

That is, the transfer section K of the third flying body 7 includes the gripper 71 driven by an actuator and configured to grip the work-related article, the support 85 supporting the work-related article, or the storage configured to store the work-related article, and the transfer section K is configured to transfer the work-related article by the gripper 71.

Note that the third flying body 7 is configured to transfer the work-related article such as the battery or the seedling mat 84 while the work vehicle E such as the mower 4 or the rice transplanter 2 is traveling and performing its work. At this time, the flight controller 93 of the third flying body 7 performs the above-mentioned maintaining control. However, example embodiments of the present invention are not limited to this, and the flight controller 93 of the third flying body 7 may perform the above-mentioned vehicle body landing control instead of the maintaining control.

The work assisting system A in the present example embodiment also includes a weight detector (not illustrated) configured or programmed to acquire a weight value indicative of the weight of the work-related article before the work-related article is transferred. The weight detector may be provided for the work vehicle E or may be provided for the flying body G. The weight detector may include a load sensor such as a load cell, for example.

In a case where the weight value is larger than a predetermined threshold, the transfer section K may be configured to transfer the work-related article by an amount equal to or less than an amount corresponding to the threshold, out of the work-related article to be transferred. Although the threshold is not limited in particular, the threshold may be a value corresponding to a maximum load determined in the specification of the transfer section K or the flying body G.

For example, in the example illustrated in FIG. 6, the weight of the support 85 supporting the plurality of seedling mats 84 may be acquired by the weight detector provided for the flying body G. In this case, the weight acquired by the weight detector is a total weight of the plurality of seedling mats 84 and the support 85 and corresponds to the above-mentioned "weight value."

At this time, in a case where the weight acquired by the weight detector is larger than the predetermined threshold, the third flying body 7 controls the two grippers 71 such that the seedling base 21 is supplied with the seedling mat 84 by an amount equal to or less than an amount corresponding to the threshold or less. At this time, for example, the third flying body 7 stops transporting the support 85 supporting the plurality of seedling mats 84 to the seedling base 21 and flies toward the seedling base 21 with the grippers 71 directly gripping the seedling mat 84 (for example, one seedling mat 84) by the amount equal to or less than the amount corresponding to the threshold, and then, the third flying body 7 supplies the seedling base 21 with the seedling mat 84.

The work assisting system A also includes a flying body determiner (not illustrated) configured or programmed to determine a flying body G suitable for the transfer of the work-related article from among the plurality of flying bodies G based on a weight value acquired by the weight detector. The flying body determiner may be provided for the management computer 1, may be provided for the work vehicle E, or may be provided for the flying body G. The flying body determiner may be a physical device such as a microcomputer or may be a functional section in software. The flying body determiner may be configured or programmed to transmit an assist command to the second communicator 91 of the flying body G determined by the flying body determiner.

For example, in the example illustrated in FIG. 6, in a case where the weight detector of the third flying body 7 acquires the weight of the support 85 supporting the plurality of seedling mats 84, the flying body determiner determines whether or not the weight is larger than the predetermined threshold. Although the threshold is not limited in particular, the threshold may be a value corresponding to a maximum load determined in the specification of the third flying body 7 or the transfer section K of the third flying body 7. In a case where the weight is equal to or less than the threshold, the flying body determiner determines the third flying body 7 as the flying body G suitable to supply the seedling base 21 with the seedling mat 84.

In a case where the weight is larger than the predetermined threshold, the flying body determiner determines a flying body G different from the third flying body 7 (preferably, the flying body G with a payload larger than that of the third flying body 7) as the flying body G suitable to supply the seedling base 21 with the seedling mat 84. In this case, the flying body determiner orders the third flying body 7 to stop the supply of the seedling mat 84.

In a case where the weight detector is provided for the work vehicle E, it is possible to achieve a configuration in which the flying body determiner performs determination such that only a flying body G that can tolerate the weight of the work-related article which weight corresponds to the weight value acquired by the weight detector heads for assisting the work vehicle E. In this case, it is possible to prevent such a situation that the transfer of the work-related article is canceled due to the weight of the work-related article.

As illustrated in FIG. 4, the first battery 81 includes an outer wall portion having a recessed portion 83. Although not illustrated herein, the second battery 82 also includes an outer wall portion having the recessed portion 83.

The battery mounting section 41 includes a stopper 42 at a portion facing the recessed portion 83. The stopper 42 is configured to be horizontally advanceable and retractable by an electric motor or the like, as indicated by an arrow in FIG. 4, for example.

When the stopper 42 projects with the first battery 81 or the second battery 82 being mounted on the battery mounting section 41, the stopper 42 enters the recessed portion 83. At this time, the first battery 81 or the second battery 82 mounted on the battery mounting section 41 is not detachable from the battery mounting section 41. That is, at this time, the mower 4 is in a state where detachment of the first battery 81 or the second battery 82 is not performable. In the following description, a state where the transfer of the work-related article is not performable as such is referred to a "first state."

When the stopper 42 retracts with the first battery 81 or the second battery 82 being mounted on the battery mounting section 41, the stopper 42 does not enter the recessed portion 83. At this time, the first battery 81 or the second battery 82 mounted on the battery mounting section 41 is detachable from the battery mounting section 41. That is, at this time, the mower 4 is in a state where detachment of the first battery 81 or the second battery 82 is performable. In the following description, a state where the transfer of the work-related article is performable as such is referred to a "second state."

As such, the mower 4 is configured to be changeable between the first state, in which the transfer of the battery as the work-related article is not performable, and the second state, in which the transfer of the battery as the work-related article is performable. However, example embodiments of the present invention are not limited to this, and both the mower 4 and the transfer section K, or only the transfer section K may be configured to be changeable between the first state and the second state.

That is, at least either one of the work vehicle E and the transfer section K is configured to be changeable between the first state, in which the transfer of the work-related article is not performable, and the second state, in which the transfer of the work-related article is performable.

Figure 7:
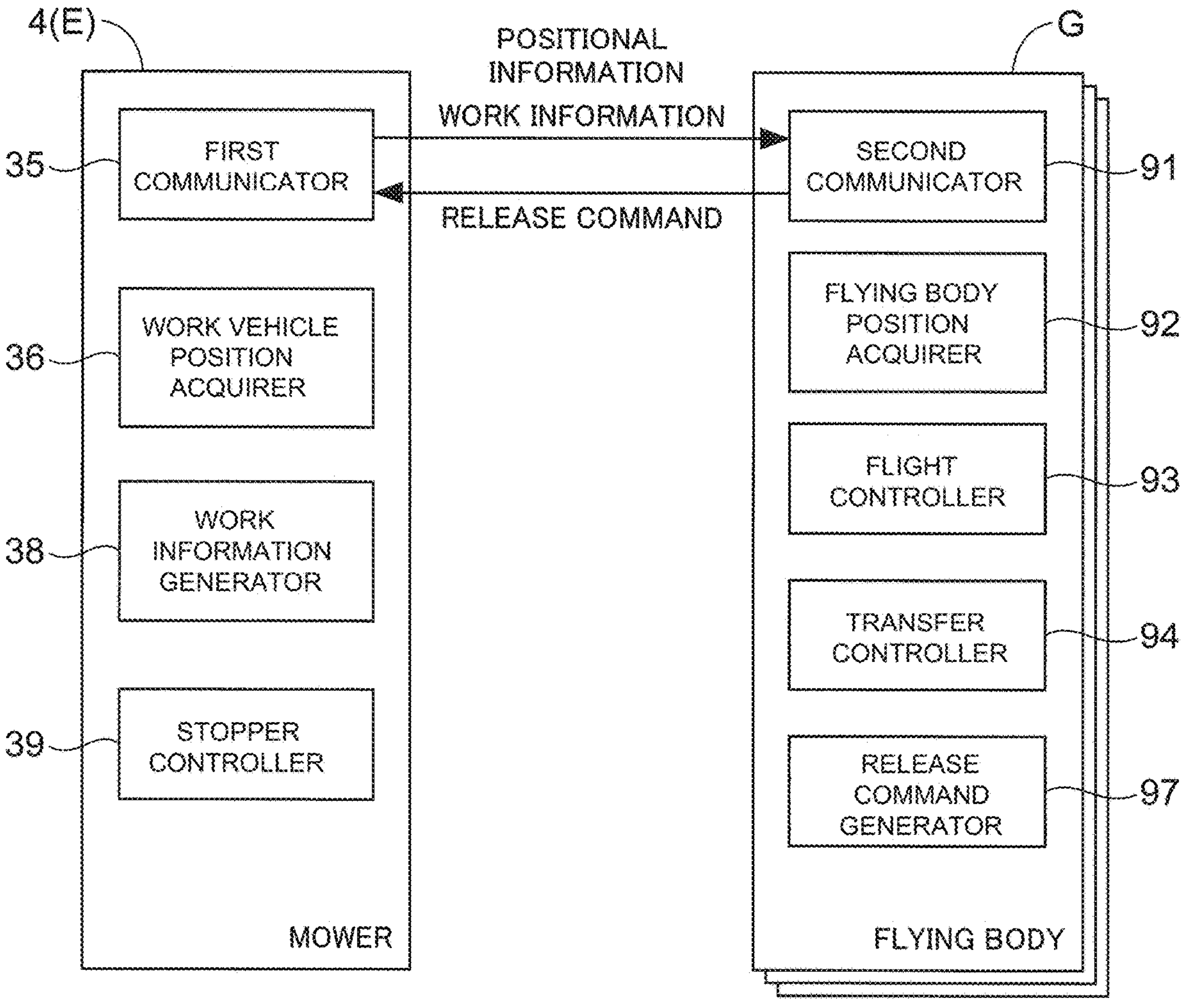
FIG. 7 is a block diagram illustrating the configuration of the work assisting system.

As illustrated in FIG. 7, the mower 4 includes a stopper controller 39 (corresponding to a "state controller" according to an example embodiment of the present invention). The stopper controller 39 controls advancing and retracting of the stopper 42. Thus, the stopper controller 39 performs a state change between the first state and the second state.

That is, the work assisting system A includes the stopper controller 39 configured or programmed to perform a state change between the first state and the second state.

As illustrated in FIG. 7, each flying body G includes a release command generator 97. The release command generator 97 generates a release command to order a state change from the first state to the second state. The generated release command is transmitted from the second communicator 91 to the first communicator 35 of the mower 4. When the first communicator 35 of the mower 4 receives the release command, the stopper controller 39 of the mower 4 controls the stopper 42 in a retracting state. Thus, the state change from the first state to the second state is performed.

For example, as illustrated in FIGS. 4, 5, in a case where the third flying body 7 replaces the battery of the mower 4, positional information on the mower 4 which positional information is acquired by the work vehicle position acquirer 36, and work information on the mower 4 which work information is generated by the work information generator 38 are transmitted from the first communicator 35 to the second communicator 91, as illustrated in FIG. 7.

Then, the third flying body 7 flies toward the mower 4 through control by the flight controller 93 based on positional information on the third flying body 7 and the positional information on the mower 4. The above-mentioned release command is transmitted to the mower 4 before the third flying body 7 reaches the position of the mower 4. Thus, the stopper controller 39 performs the state change from the first state to the second state while the third flying body 7 is flying toward the mower 4 to transfer the battery. In other words, the stopper controller 39 performs the state change from the first state to the second state before the third flying body 7 reaches the position of the mower 4.

After that, when the third flying body 7 reaches the position of the mower 4, the third flying body 7 replaces the battery through control by the transfer controller 94 based on the work information on the mower 4. Note that, in this case, the transfer controller 94 controls the two grippers 71. In addition, in this case, the work information may be information indicative of the type of a battery suitable for the mower 4, and the third flying body 7 may be configured transport a suitable battery to the mower 4 based on the information, for example.

Note that each element (each element included in the management computer 1, the work vehicle E, or the flying body G) such as the first communicator 35 or the work vehicle position acquirer 36 illustrated in FIGS. 3, 7 may be a physical device such as a microcomputer or may be a functional section in software, or a combination thereof.

In FIG. 3, the release command generator 97 provided for each flying body G is not illustrated. In FIG. 7, the execution determiner 95 and the lock controller 96 provided for each flying body G are not illustrated.

With the configuration described above, the flying body G can approach the work vehicle E while transporting the work-related article and transfer the work-related article. Thus, the flying body G can easily transfer the work-related article while the work vehicle E continues its work. As a result, it is possible to reduce or prevent a decrease in working efficiency due to the transfer of the work-related article.

In the configuration described above, the flying body G transfers the work-related article based on the work information. Thus, in a case where the work information is information indicative of the residual amount of the material, for example, the flying body G can supply the work vehicle E with an appropriate amount of the material. As a result, the number of times of supply of the material or the supply amount of the material can be easily reduced or minimized. Thus, it is possible to reduce or prevent a decrease in working efficiency due to the transfer of the work-related article.

That is, with the configurations described above, it is possible to provide work assisting systems that each can easily reduce or prevent a decrease in working efficiency due to the transfer of a work-related article.

Other Example Embodiments (1) The hopper 33 may include a cover covering the opening 33*a*, and the cover may be changeable between a closed state and an open state. In this case, the closed state corresponds to the above-mentioned "first state," and the open state corresponds to the above-mentioned "second state."

(2) The transfer section K may be configured to attach and detach a component related to the work performed by the work vehicle E. Thus, component replacement and maintenance of the work vehicle E can be performed. In this case, the component corresponds to the "work-related article" according to an example embodiment of the present invention. Further, the detachment and the attachment correspond to the "transfer" according to an example embodiment of the present invention.

(3) The flight controller 93 may be configured or programmed not to be able to perform the maintaining control.

(4) The flight controller 93 may be configured or programmed not to be able to perform the vehicle body landing control.

(5) The work assisting system A may include only one flying body G. Even in a case where the work assisting system A includes only one flying body G, when the transfer section K is replaced with a transfer section K of another type, a work-related article of another type can be transferred. Thus, the work assisting system A that can transfer various work-related articles is easily achieved.

(6) Some or all elements included in the management computer 1 may be included in the flying body G or may be included in the work vehicle E. That is, the work assisting system A may not include the management computer 1.

(7) The flying body G may be configured to place the work-related article to a predetermined spot by the transfer section K. In this case, the placement corresponds to the "transfer" according to an example embodiment of the present invention. In this configuration, in a case where the work vehicle E passes the spot or its vicinity in the middle of the work, the work vehicle E can be easily supplied with the work-related article.

(8) The flying body G may be configured to collect the work-related article placed in the predetermined spot by the transfer section K. In this case, the collection corresponds to the "transfer" according to an example embodiment of the present invention.

(9) The transfer section K may collect the chemical agent from the work vehicle E. In this case, the collection corresponds to the "transfer" according to an example embodiment of the present invention. After the chemical agent is collected, the transfer section K may supply a chemical agent of another type. In this case, the supply corresponds to the "transfer" according to an example embodiment of the present invention.

(10) The flying body G may include a detector (for example, a camera or the like) configured to acquire information indicative of the residual amount of the material by detecting the residual amount of the material (for example, the seedling mat 84) in the work vehicle E. In this case, the information indicative of the residual amount of the material corresponds to the "work information" according to an example embodiment of the present invention. The detector corresponds to the "information acquirer" according to an example embodiment of the present invention.

(11) The work assisting system A may be configured or programmed to assist work performed by a work vehicle E of a type other than the types described in the above example embodiments. For example, the work assisting system A may assist the work performed by the work vehicle E such as a combine harvester or a construction work vehicle.

The configurations described in the example embodiments (including the alternative example embodiments; the same applies hereinafter) can be applied in combination with configurations of other example embodiments as long as no inconsistency occurs. Further, the example embodiments disclosed in the present specification are just examples. The example embodiments of the present invention are not limited to them, and various modifications can be made within a range that does not deviate from the object of the present invention.

Example embodiments of the present invention are applicable to work assisting systems to assist with work performed by a work vehicle.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work assisting system comprising:
- a tractor including a hopper to spray a material; and
- a flying body including:
  - a flying apparatus capable of flying and transporting the material; and
  - a transfer section connected to the flying apparatus to transfer the material between the flying body and the tractor; wherein
- the flying body includes an information acquirer configured or programmed to acquire work information on the material, the work information indicating a residual amount of the material retained in the hopper; and
- the flying body is operative to cause the transfer section to supply the hopper with the material based on the work information.

2. The work assisting system according to claim 1, further comprising:
- a flight controller configured or programmed to control flight of the flying body; wherein
- the flight controller is configured or programmed to perform a maintaining control to control the flight of the flying body in such a manner as to maintain a positional relationship between the tractor and the flying body, during the work performed by the tractor; and
- the transfer section is configured to transfer the material during execution of the maintaining control.

3. The work assisting system according to claim 1, further comprising:
- a flight controller configured or programmed to control flight of the flying body; wherein
- the flight controller is configured or programmed to control the flight of the flying body in such a manner as to cause the flying body to land on the tractor, during the work performed by the tractor; and
- the transfer section is configured to transfer the material after the flying body lands on the tractor.

4. The work assisting system according to claim 1, wherein
- at least either the tractor or the transfer section is switchable between a first state, in which the transfer of the material is not performable, and a second state, in which the transfer of the material is performable; and
- the work assisting system further comprises a state controller configured or programmed to switch the at least either the tractor or the transfer section between the first state and the second state.

5. The work assisting system according to claim 4, wherein the state controller is configured or programmed to switch the at least either the tractor or the transfer section from the first state to the second state while the flying body is flying toward the tractor to transfer the material.

6. The work assisting system according to claim 1, further comprising:

a connection mechanism configured to connect the tractor to the transfer section, the connection mechanism being switchable between a locked state, in which the tractor is kept connected to the transfer section, and an unlocked state, in which the tractor is disconnectable from the transfer section; and a lock controller configured or programmed to switch the connection mechanism between the locked state and the unlocked state.

7. The work assisting system according to claim 1, further comprising:

an execution determiner configured or programmed to determine an execution position or an execution timing for the transfer of the material between the flying body and the tractor based on the work information.

8. The work assisting system according to claim 7, wherein the execution determiner is configured or programmed to determine the execution position or the execution timing in such a manner as to cause the work performed by the tractor to be less delayed due to the transfer of the material.

9. The work assisting system according to claim 7, wherein in a case where a material as the material is transferred from the flying body to the tractor, the execution determiner is configured or programmed to determine the execution position or the execution timing in such a manner as to prevent the tractor from running out of the material.

10. The work assisting system according to claim 7, wherein the execution determiner is configured or programmed to determine the execution position or the execution timing in such a manner as to secure stability of the transfer of the material.

11. The work assisting system according to claim 7, wherein the execution determiner is configured or programmed to determine the execution position or the execution timing in such a manner as to cause the material to be transferred while the tractor linearly moves.

12. The work assisting system according to claim 7, wherein the execution determiner is configured or programmed to determine the execution position or the execution timing in such a manner as to cause the material to be transferred while the tractor travels at a low speed.

13. The work assisting system according to claim 7, wherein the execution determiner is configured or programmed to calculate, based on positional information of the flying body and positional information of the tractor, a distance between the tractor and a farm location where the flying body waits; and the execution determiner is configured or programmed to determine the execution timing to be a timing at which the distance becomes a predetermined distance or less.

14. The work assisting system according to claim 1, wherein the hopper includes an opening facing upward; and the transfer section is configured to move the material down to the opening from above the opening to supply the hopper with the material.

* * * * *